United States Patent [19]

Pollock et al.

[11] Patent Number: 5,269,546
[45] Date of Patent: Dec. 14, 1993

[54] SELF-STEERING ASSEMBLY

[75] Inventors: Paul R. Pollock; Anil K. Bansal; Richard D. Ryan; Dennis T. Mahoney, all of Ft. Wayne, Ind.

[73] Assignee: Dana Corporation, Toledo, Ohio

[21] Appl. No.: 906,326

[22] Filed: Jun. 30, 1992

[51] Int. Cl.$^5$ .............................................. B62D 1/06
[52] U.S. Cl. .................................... 280/81.6; 280/96.1
[58] Field of Search ............................ 280/81.6, 96.1

[56] References Cited

U.S. PATENT DOCUMENTS

| | | |
|---|---|---|
| 1,313,394 | 8/1919 | Lasserre ............................ 280/96.1 |
| 3,899,188 | 8/1975 | Curry . |
| 4,076,264 | 2/1978 | Chatterley ........................ 280/81.6 |
| 4,162,082 | 7/1979 | Curry . |
| 4,195,856 | 4/1980 | Larson et al. . |
| 4,441,730 | 4/1984 | Damm . |
| 4,705,133 | 11/1987 | Christenson et al. . |
| 4,762,421 | 8/1988 | Christenson et al. . |
| 4,786,114 | 11/1988 | Steiner et al. . |
| 4,967,584 | 11/1990 | Sato et al. . |
| 5,029,885 | 7/1991 | Steiner . |

FOREIGN PATENT DOCUMENTS

| | | | |
|---|---|---|---|
| 692487 | 7/1965 | Italy ............................ | 280/81.6 |
| 159925 | 4/1979 | Netherlands ............... | 280/81.6 |

*Primary Examiner*—Eric D. Culbreth
*Attorney, Agent, or Firm*—Millen, White, Zelano & Branigan

[57] ABSTRACT

A self-steering assembly for self-steering wheels used on trucks carrying heavy loads includes a kingpin arm unit with a unitary adaptor collar at one end for mounting on a conventional tubular axle and a knuckle at the other end for retaining the clevis of a pivot link with a kingpin. The pivot link has a knuckle upon which is fixed a standard spindle unit having a steering arm secured thereto so that the assembly may be coupled to a similar assembly at the other end of the axle. A damper is pivoted at one end to the steering arm and at the other end to the axle. The self-steering assembly provides for the utilization of standard components in self-steering assemblies heretofore used only for steered axles.

9 Claims, 3 Drawing Sheets

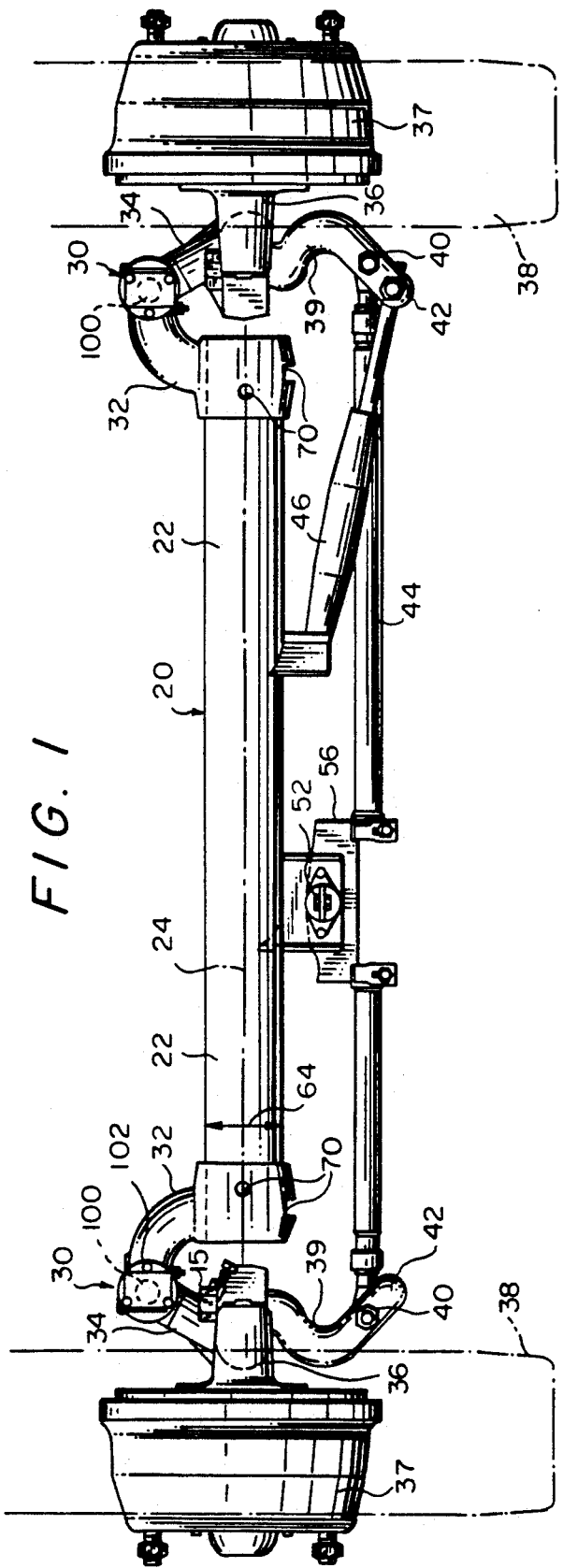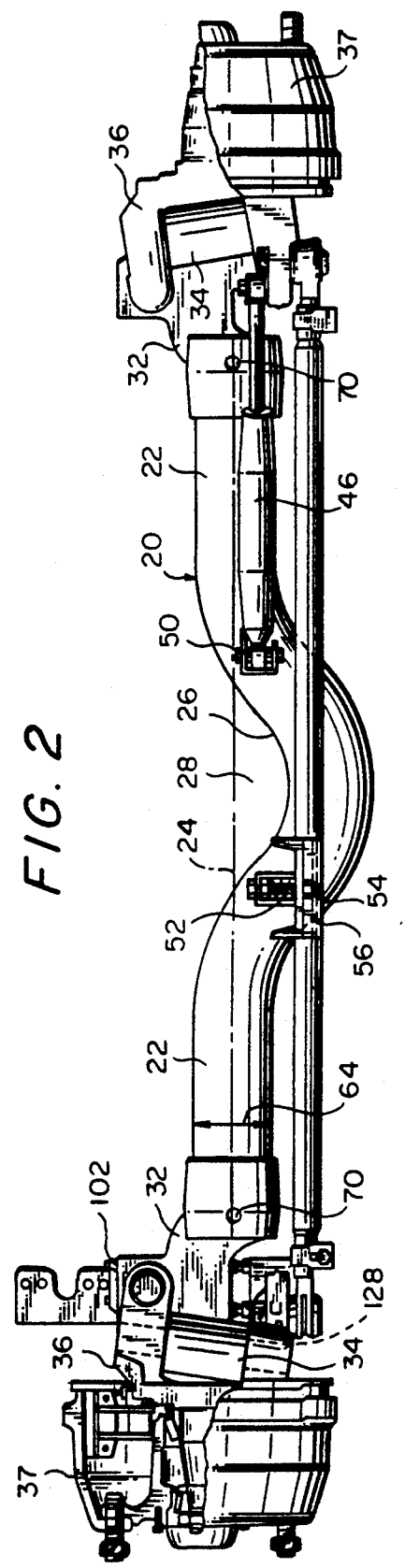

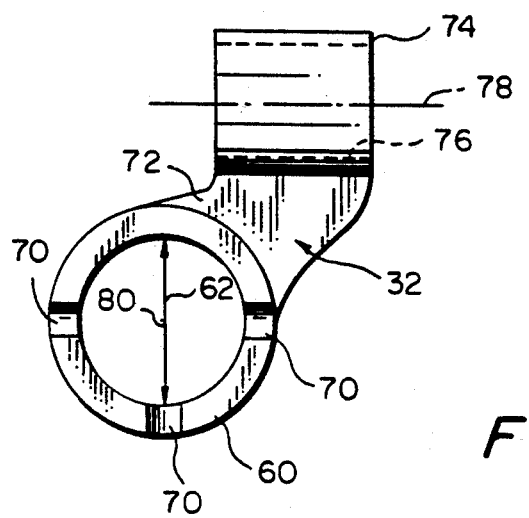
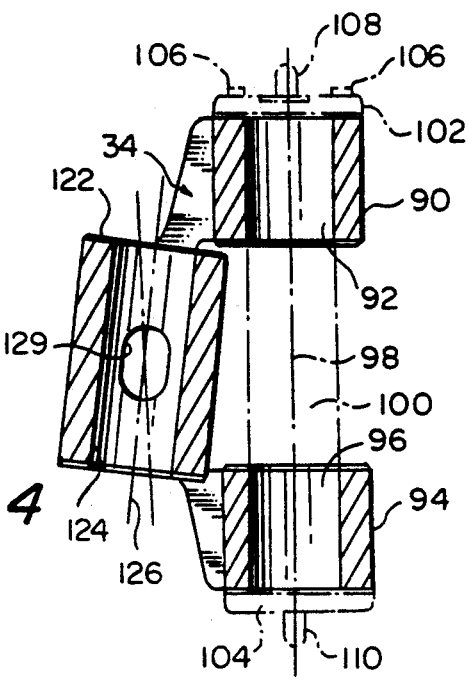
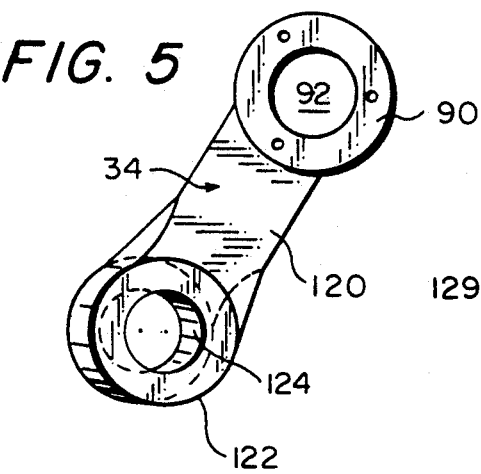
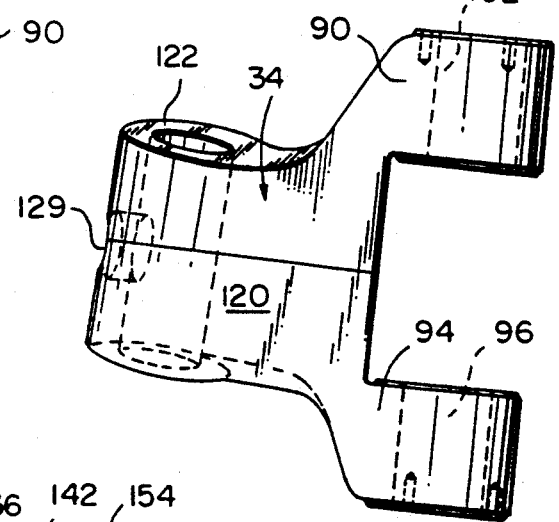
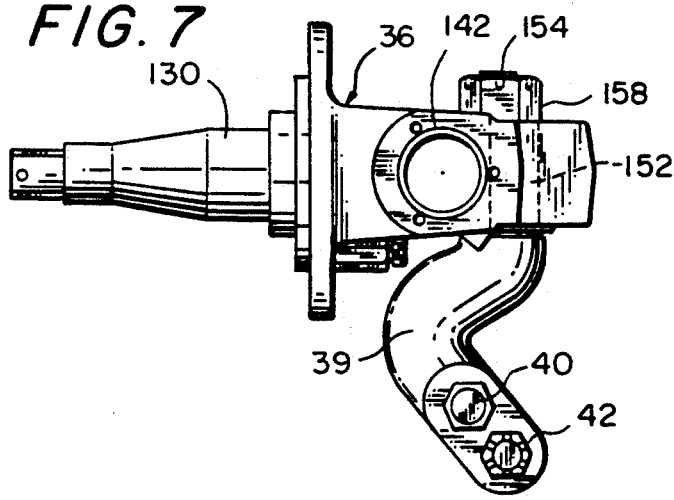

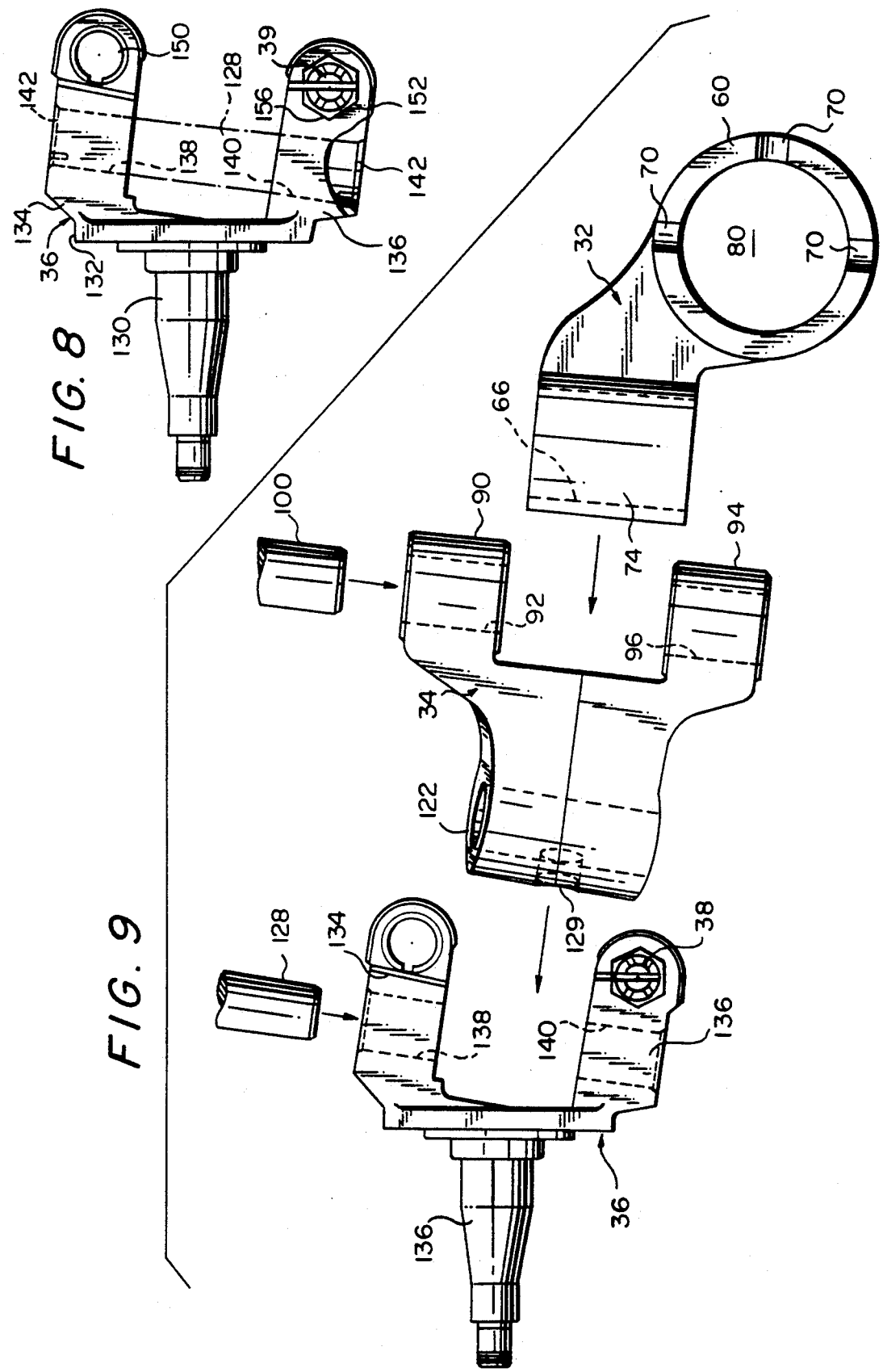

SELF-STEERING ASSEMBLY

BACKGROUND OF THE INVENTION

1. Field of the Invention

The invention relates to an improved, self-steering, auxiliary axle assembly for vehicles such as, but not limited to, heavy load-transporting vehicles such as dump trucks.

2. Background Art

In recent years, there has been considerable effort devoted to developing self-steering axle assemblies attachable to heavy trucks so that these trucks can meet governmentally imposed weight restrictions. These weight restrictions arose out of a need to minimize pavement and bridge damage due to trucks carrying heavy loads.

Maneuverability of trucks such as dump trucks, cement mixers, semi-trailers and refuse vehicles is affected by two diametrically opposed considerations. First, the federal bridge formula weight laws normally require trucks to have a relatively long wheel base and, secondly, congested job sites necessitate tight turning radii which usually require a short wheel base.

The federal bridge formula is applied for determining how much a vehicle can legally weigh and how long the vehicle must be. The formula spells out the distances required between axle groups for a given vehicle weight and is designed to protect bridges and highways by requiring a vehicle's weight to be distributed over axles spaced far apart. By so designing a vehicle, the entire weight of a vehicle is not concentrated on a short section of a bridge span or road surface.

A solution to this problem is a vehicle configured with self-steering, liftable tag axles and pusher axles. This arrangement meets the federal bridge formula by placing additional axles on the road while the vehicle is travelling to a job site. After the vehicle reaches the job site, the tag and pusher axles can be lifted for slow speed maneuvering. While the primary consideration in utilizing self-steering, tag and pusher axles is to comply with federal bridge formula standards, there is the advantage to the vehicle owner that tire scuff and frame-side loading are both reduced, while increased payload and fuel economy provide economic advantages.

One disadvantage of providing self-steering, tag and pusher axles is that they add considerable expense to the initial cost of a vehicle, as well as adding additional mechanical components which must be understood and maintained by mechanics and which, if not maintained, can eventually reduce the efficiency of the vehicle and perhaps even disable the vehicle.

SUMMARY OF THE INVENTION

In view of the aforementioned considerations, it is an object of the present invention to provide new and improved self-steering, tag and pusher axles which are economical to purchase and which have components that are familiar to operators and maintenance personnel.

In view of the aforementioned object and other objects, a self-steering assembly is mounted on a standard tubular axle by an adaptor with a collar having an inner diameter approximating the outer diameter of the axle so that the axle closely fits within the collar. A plurality of holes are provided in the collar for plug welding the adaptor to the axle. Attached to the adaptor is a kingpin arm having a first end unitary with the adaptor and a second end defining a knuckle with a bore therethrough which extends perpendicular to the axis of the adaptor. A pivot link in the form of a clevis has upper and lower fork arms at one end having upper and lower coaxial bores therethrough and, at the other end, a second knuckle with a bore therethrough extending at a slight angle with respect to the coaxial bores in the fork arms. The pivot link is retained on the knuckle of the kingpin arm by a kingpin received through the bores of the fork arms and the first knuckle. A spindle unit having a spindle projecting in a first direction and yoke projecting in a second direction with bores therein, is mounted on the pivot link by a retaining pin received through bores in the yoke and the bore of the second knuckle to non-rotatably secure the spindle unit to the pivot link. Fixed to the spindle unit and extending in a direction away from the pivotal link is a steering link having pivots thereon for pivoting a tie rod to tie the assembly to an identical assembly at the other end of the axle and for mounting a damper having one end pivoted on the steering link and the other end pivoted to the axle.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 is a top view of self-steering assemblies configured in accordance with the principles of the instant invention shown mounted on an axel;

FIG. 2 is a front view of self-steering assemblies configured in accordance with the principles of the instant invention shown mounted on an axel;

FIG. 3 is a rear view of a kingpin arm with a collar adapter used with the assemblies of FIGS. 1 and 2;

FIG. 4 is a side elevation of a pivot link attachable to the kingpin arm of FIG. 3;

FIG. 5 is a top view of the pivot link of FIG. 4;

FIG. 6 is a front view of the pivot link of FIGS. 4 and 5;

FIG. 7 is a top view of a spindle unit mounted on the clevis link of FIGS. 4-6;

FIG. 8 is a front view of the spindle unit of FIG. 7; and

FIG. 9 is an exploded front view of a self-steering assembly without the to which it is fixed.

DETAILED DESCRIPTION

Referring now to FIGS. 1 and 2, there is shown a tubular axle 20 of a conventional construction which is generally used to support non-steering wheels (not shown). The tubular axle 20 has end portions 22 which are coaxial about an axis 24 and an intermediate portion 26 which curves down and away from the axis 24 to provide a space 28 for the drive shaft (not shown) of the vehicle (not shown) upon which the tubular axle 20 is mounted.

In accordance with the instant invention, fixed to each end of the tubular axle 20 is a self-steering assembly 30 which is comprised of three primary components including a kingpin arm unit 32, a clevis link 34 and a spindle unit 36. The kingpin arm units 32 position the spindle units 36 in front of (FIG. 1) and slightly above (FIG. 2) the axis 24 of the axle 20. As will be further explained hereinafter, each steering assembly 30 is assembled in accordance with the illustration of FIG. 9. The spindle assemblies 36 mount hub-and-drum assemblies 37 for wheels 38 and include steering arms 39 fixed thereto which have an inboard pivot point 40 and an outboard pivot point 42. Journalled to the inboard pivot points 40 is a tie rod 44. A hydraulic shock absorber 46 has a first end pivoted to the outboard pivot point 42 on one of the steering arms 38 and a second end pivoted by pivot to a bracket 50 which projects from the tubular axle 22.

Typically, the axle 20 is mounted on a lift (not shown) which selectively raises and lowers the wheels 38 so that the wheels can be lowered when the truck (not shown) is transporting a heavy load and raised when the truck is empty or at a site which requires increased maneuverability.

Under some circumstances, it may be desirable to lock the self-steering wheels 38 while still keeping the wheels on the road. This is accomplished by projecting a spring retracted detent 52 from the axle 20 into a recess 54 in a plate 56 fixed to the tie rod 44.

As is seen in FIG. 3, each kingpin arm unit 32 has a collar 60 defining an inner cylindrical diameter 62 closely approximating the outer diameter 64 (see FIGS. 1 and 2) of the axle 20. The collar 60 has three circular openings 70 therethrough so that the collar may be plug-welded to the axle 20 to fix the kingpin arm unit 32 thereto.

Unitary with the collar 60 is a kingpin arm 72 terminating in a first knuckle 74. The knuckle 74 has a cylindrical bore 76 therethrough with an axis 78 which extends perpendicular to the axis 80 of the collar 60 so that, when the collar 60 is mounted on axle 20, the bore 76 extends vertically with respect to the horizontal axis 24 of the axle 20. As is seen in FIG. 2, the arm 32 is configured to displace the knuckle 74 not only horizontally, but vertically, with respect to the axis 24.

Referring now to FIGS. 4, 5 and 6, there is shown a pivot link 34 in the form of a clevis which is pivoted on the first knuckle 74 of the kingpin arm unit 32. The pivot link 34 includes a first fork comprising an upper fork arm 90 having a bore 92 therethrough and a lower fork arm 94 having a bore 96 therethrough. When the pivot link 34 is pivotally mounted on the first knuckle 74 of the kingpin arm unit 32 (FIG. 3) by placing the first knuckle between the fork arms 90 and 94, the upper and lower bores 92 and 96 are aligned with the bore 76 in the first knuckle to receive a kingpin 100. Upper and lower end plates 102 and 104 (dotted lines, FIG. 4) are bolted to the upper and lower outer surfaces of fork arms 90 and 94 by bolts 106 to retain the kingpin 100 in place and grease nipples 108 and 110 are provided to lubricate the kingpin assembly resulting from the pivot link 34 being mounted in the first knuckle 74 on the kingpin arm unit 32.

Pivot link 34 has a connecting strut 120 having a second knuckle 122 at the end thereof. As is seen in FIG. 4, the second knuckle 122 has a bore 124 therethrough with an axis 126 which is tilted at a slight angle of about 7° with respect to the axis 98 of the bores 92 and 96. The bore 124 receives therethrough a retaining pin 128 (see also FIGS. 8 and 9) which mounts the spindle assembly 36 in a fixed, non-rotatable relationship with the link 34. An oblong recess 129 is provided in the second knuckle 122 so that the second knuckle can be plug-welded to the retaining pin 128.

Referring now to FIGS. 7, 8 and 9 in conjunction with FIGS. 1 and 2, the spindle unit 36 is of a conventional, widely used design configuration. The spindle unit 36 mounts a conventional hub-and-drum assembly, such as hub-and-drum assembly 37 of FIGS. 1 and 2, on a spindle 130. The spindle 130 is unitary with a yoke 132 which has an upper fork arm 134 and a lower fork arm 136, the upper fork arm having a bore 138 therethrough and the lower fork arm having a bore 140 therethrough. The second knuckle 122 of pivot link 34 (FIGS. 4–6) is placed between the fork arms 134 and 136 with bores 138 and 140 receiving the pin 128 which is welded within the bores by welds 142 to keep spindle unit 36 from rotating on knuckle 122.

Since the spindle unit 36 is a conventional unit, it has a first horizontal bore 150 through the upper fork 134 which is not used for its conventional purpose in the installation of the present invention, and a second horizontal bore 152 through the lower fork which mounts the steering link 39 in rigid relationship with respect to the spindle unit 36. The steering link 39 has a shank with a threaded end 154 which is received through the bore 152 and is retained by a key-in-slot coupling 156 so as not to rotate in the second bore. A nut 158 on the threaded end 154 of the shank retains the steering link 39 in place.

Without further elaboration, it is believed that one skilled in the art can, using the preceding description, utilize the present invention to its fullest extent. The preferred specific embodiments are, therefore, to be construed as merely illustrative, and not limitative of the disclosure in any way whatsoever.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A self-steering assembly comprising:
   a tubular axle having opposite ends, a first axis and a selected outer diameter at the ends thereof, the tubular axle supporting non-steering wheels;
   a pair of adaptors, each having a collar defined by an annular wall, the annular wall having an inner diameter approximating the outer diameter of the tubular axle, an axis which coincides with the first axis of the tubular axle and a plurality of holes therein for plug welding the adaptor to the axle, the collars each fitting over one of the opposite ends of the tubular;
   a pair of kingpin arms, each having first and second ends, the first ends of each kingpin arm being unitary with one of the adaptors and the second end of each kingpin arm defining a first knuckle with a bore therethrough which bore extends perpendicular to the axis of the annular wall of the respective collar;
   a pair of pivot links, each in the form of a clevis having first and second ends, the first end of each pivot link having a first set of upper and lower fork arms, with the first set of upper and lower fork arms having upper and lower aligned bores, the second end of each pivot link having a second knuckle with a bore therethrough having an axis extending at a slight angle with respect to the axis of the coaxial bores in the fork arms;

a pair of kingpins joining the pivot links to the kingpin arms, the kingpins being received in the first knuckles and the bores of the first sets of upper and lower fork arms;

a pair of spindle units, each having a spindle projecting in a first direction and a yoke projecting in a second direction, the yokes of the spindle units having second sets of upper and lower fork arms between which are received the second knuckles of the respective pivot links, the upper fork arms each having an upper bore therethrough and the lower fork arms each having a lower bore therethrough axially aligned with the upper bore;

retaining pins received through the upper and lower bores of the second sets of fork arms and the bores of the second knuckles to secure the spindle units to the pivot links;

means for locking the spindle units against rotation with respect to the second knuckles, whereby the spindle units are fixed with respect to the pivot links;

steering arms fixed to the lower forks of the spindle units and extending away from the pivot links, the steering arms having pivots thereon;

a tie rod to tie the steering arms to one another, the tie rod extending between the pivot arms and coupled thereto at the pivots on the steering arms; and a damper means having one end pivoted on the steering arm and the other end pivoted on the axle.

2. The self-steering assembly of claim 1, wherein the kingpin arm extends in both the axial and frontal directions when mounted on the axle, as well as extending in the axial direction beyond the end plate of the collar.

3. The self-steering assembly of claim 2, wherein the axis of the spindle is disposed parallel to but vertically displaced from the axis of the axle when the assembly is mounted on the axle for use with a vehicle.

4. The self-steering assembly of claim 1, further including means disposed adjacent the tie rod for selectively locking the pivot link with respect to the kingpin arm so that the pivot link does not rotate with respect to the arm.

5. The self-steering assembly of claim 4, wherein the tubular axle has an arcuate intermediate portion disposed between the joining two outboard portions which are axially aligned with the first axis, wherein the damping means comprises only on damper pivoted at one end to one of the steering arms and at the other end to standard tubular axle proximate one juncture of one outboard portion and the intermediate portion of the axle and wherein the means for selectively locking the tie rod is positioned on the intermediate portion.

6. The self-steering assembly of claim 5, wherein the damper is pivoted to the steering arm at a location outboard of the point at which the tie rod is pivoted to the steering arms.

7. The self-steering assembly of claim 1, wherein the means for locking the spindle unit against rotation comprises welds welding the retaining pin to the bores of the second set of fork arms and the bore of the second knuckle.

8. The self-steering assembly of claim 7, wherein the second knuckle includes a recess therethrough for receiving a plug weld to weld the second knuckle to the retaining pin.

9. The self-steering assembly of claim 1, wherein the collars include three holes spaced about 90° apart for plug welding the collars to the opposite ends of the tubular axle.

* * * * *